United States Patent [19]
Starp

[11] 3,935,581
[45] Jan. 27, 1976

[54] INTERCHANGEABLE LENS ADAPTABLE TO A CAMERA OR PHOTOGRAPHIC SHUTTER, WITH BUILT-IN SECTOR SYSTEM

[76] Inventor: Franz W. R. Starp, Calmbach/Schwarzwald, Germany

[22] Filed: Feb. 9, 1973

[21] Appl. No.: 331,263

[30] Foreign Application Priority Data
Feb. 11, 1972 Germany............................ 2206524

[52] U.S. Cl................................. 354/270; 354/272
[51] Int. Cl........................ G03b 9/02; G03b 17/14
[58] Field of Search........... 95/64 R, 64 A; 354/270, 354/272

[56] References Cited
UNITED STATES PATENTS 3,082,672  3/1963  Swanofsky ........................ 95/64 R
3,352,220  11/1967  Lang et al........................... 96/64 A Primary Examiner—Joseph F. Peters, Jr.
Attorney, Agent, or Firm—Arthur A. March

[57] ABSTRACT

The invention is related to a sector system capable of providing lens elements of different aperture held in different support means. Exposure of a film through the lens is determined by the opening and closing of a sector plate system and the time and extent of opening and closing is appropriately controlled by changing the position of the drive means relative to the lens forming means. In this way the sector plates for exposing the camera film to light passing through the lens travel different distances which depend upon the light aperture required in order that the exposure shall be consistent with the lens aperture and its speed and at least approximately equal to the overlap and overswing phases of the sector system.

4 Claims, 8 Drawing Figures

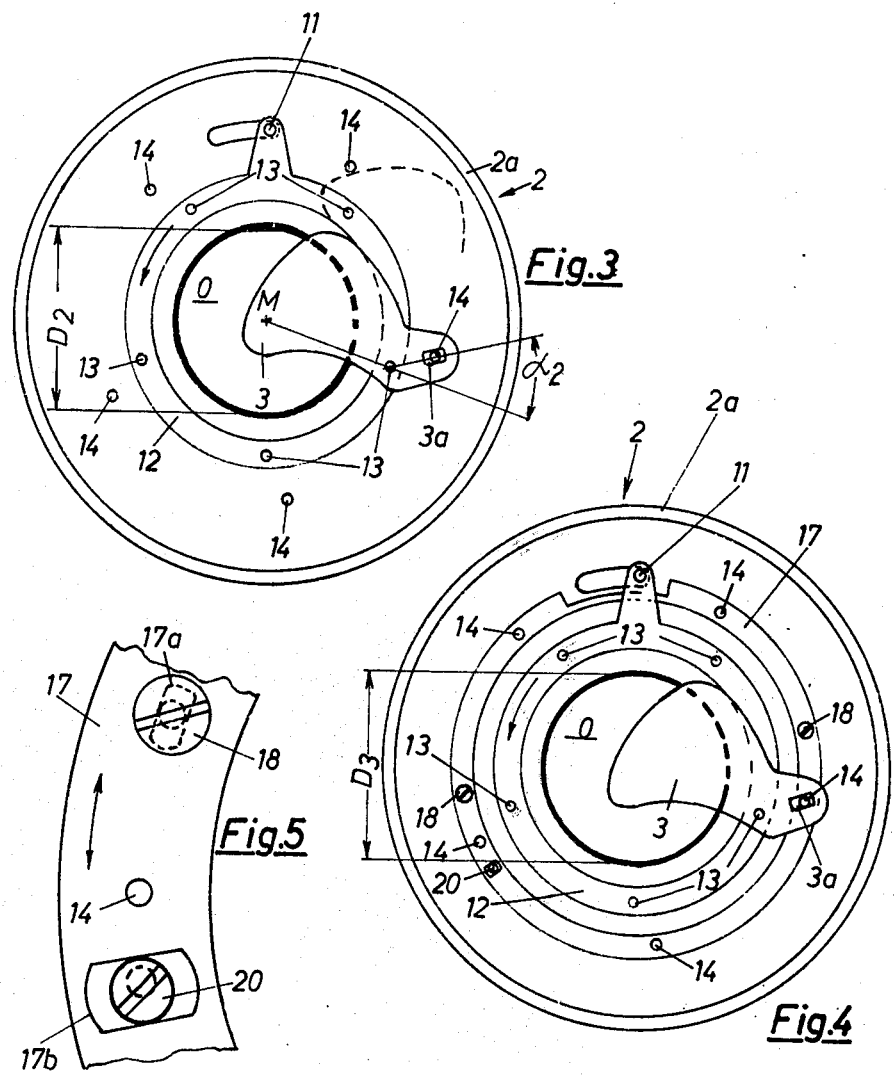

INTERCHANGEABLE LENS ADAPTABLE TO A CAMERA OR PHOTOGRAPHIC SHUTTER, WITH BUILT-IN SECTOR SYSTEM

The present invention relates to an interchangeable lens structure with built-in sector system, attachable to a camera or photographic shutter. The sectors of the interchangeable lens system compositely forming the lens aperture, are preferably mounted on fixed pins so as to be able to pivot and to be driven by means of a ring disposed concentric to the lens axis and coupled to one another by means of drive pins. The ring is caused to engage automatically with the driving member of a drive mechanism provided at the camera or shutter side when attaching the lens to the change mount of the camera or shutter.

Interchangeable lenses of different light aperture and focal length are known as such and have been used for a long time in professional photography. This applies also to the taking of pictures in studios when the photographer, adapting to the various shooting situations, uses the one or another of the plurality of lens elements which he thinks best suited for taking the particular picture. In one respect the use of such interchangeable lenses has proven to be disadvantageous, and that is because no uniform effective times and, therefore, no exact composure times can be achieved with lenses having a smaller aperture than the possible maximum. Attempts have been made to compensate for this or to wield an influence over the time behavior of the sector system by adapting the sector dimensions to the reduced diameter of the respective lens and also by using supplemental devices acting upon the sector drive mechanism, such as supplemental braking masses. However, as far as is known, none of these measures have resulted in the desired effect, not to speak of the additional structural expense they require.

It is the objective of the present invention to eliminate the disadvantages of the known change lenses, avoiding at the same time the use of supplemental means influencing the course of motion of the sector, which means to create the conditions assuring uniform effective operational time periods. Therefore, exact exposure times for change lenses of the kind described in the outset are to be achieved.

To achieve this objective it is suggested, according to the invention, that the various lens elements be interchangeable with other lenses of the same basic construction, but with a light aperture of a different size at uniform sector travel distance adapted to the lens mounting with the wider light aperture. This can be in an embodiment of a lens having a light aperture smaller than the possible maximum where the sectors travel the same distance in their back and forth motion as the sectors of a lens having the widest possible light aperture. The excess travel distance resulting from the diminution of the light aperture is apportioned in equal or at least almost equal parts to the overlap phase and the overtravel phase of the sector system.

In this manner it is always possible to achieve uniform effective times and, therefore, defined, exact exposure times in cameras in which interchangeable lenses of different light apertures are used for the purpose of adaptation to the shooting situation prevailing at the time. This constitutes the decisive advantage over the hitherto known interchangeable lenses which are afflicted with the disadvantage of forming inaccurate exposure times in case interchangeable lenses having a light aperture smaller than the widest possible are used.

One preferred and advantageous embodiment of the invention is seen by making the position of the fixed pivot pin of each sector relative to the drive pin effecting the connection with the drive ring coordinated to the diameter of the respective light aperture.

In order to be able to make certain corrections which may under some circumstances become necessary during the manufacture of the interchangeable lenses, it is further proposed, according to the invention, that the fixed mounting pins of the sector system be disposed on a ring which can be inserted in and fastened to the lens by means of screws or the like. Furthermore, means are provided through which the ring is finely adjustable within certain limits. One particularly advantageous and simple embodiment from the aspect of both function and manufacturing cost is to be seen in that an eccentric screw engaging a radial slot formed in the ring serves as the fine adjustment of the ring bearing the mounting pins.

Details of the invention are explained in the following specification and illustrated by the accompanying drawing in which:

FIG. 3 shows another interchangeable lens of the same design and dimensions, but with smaller light aperture $D_2$;

FIG. 4 represents still another embodiment of an interchangeable lens, likewise with a light aperture smaller than the widest possible in which the pins serving as fixed mountings for the sectors are disposed on an adjustable ring fastenable to a base plate;

FIG. 5 is a partial plan view of the mounting ring according to FIG. 4 in larger scale, including additional means for fine adjustment;

Figure 7:
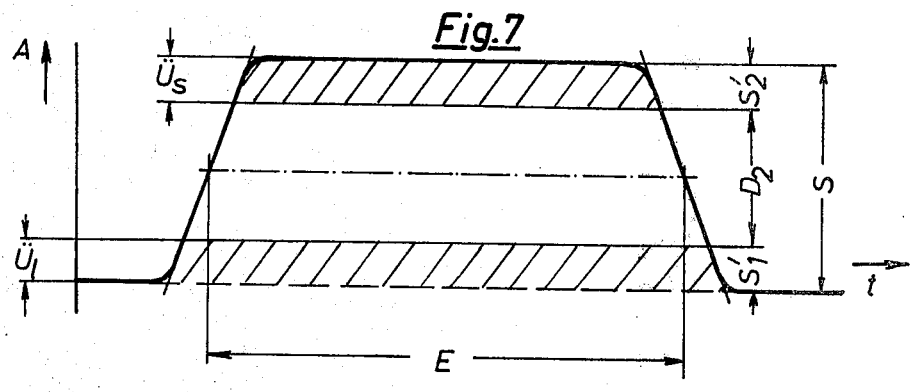
Figure 8:
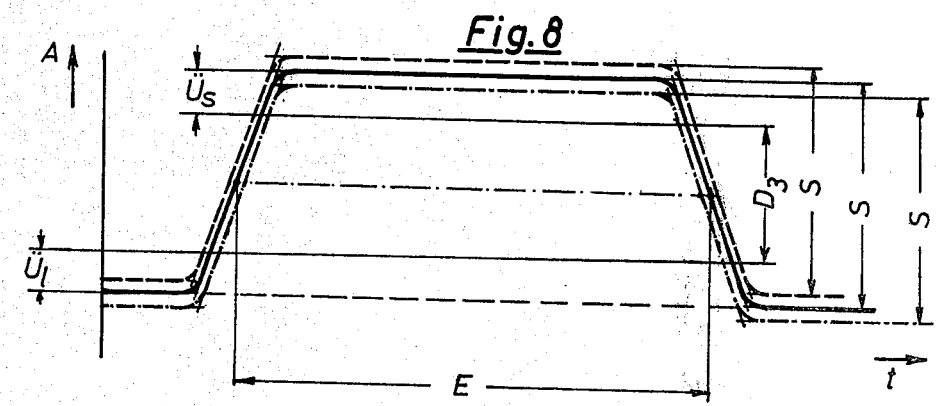

FIG. 7 is another curve to show the light flux time diagram of an interchangeable lens design according to FIG. 3 with a light aperture $D_2$ smaller than the widest possible one; and FIG. 8 is a set of plots of which the traces demonstrate the possibility of correcting the light flux time diagram due to the use of an adjustable ring carrying the fixed mounting pins of the sectors in connection with a device for the fine adjustment of said ring according to FIGS. 4 and 5 with the upper limit of the adjustment range relative to the optimum light flux time diagram being shown as an unbroken line, the upper line being shown as a dashed line and the lower limit of the adjustment range shown as a dash-dotted line.

Figure 1:
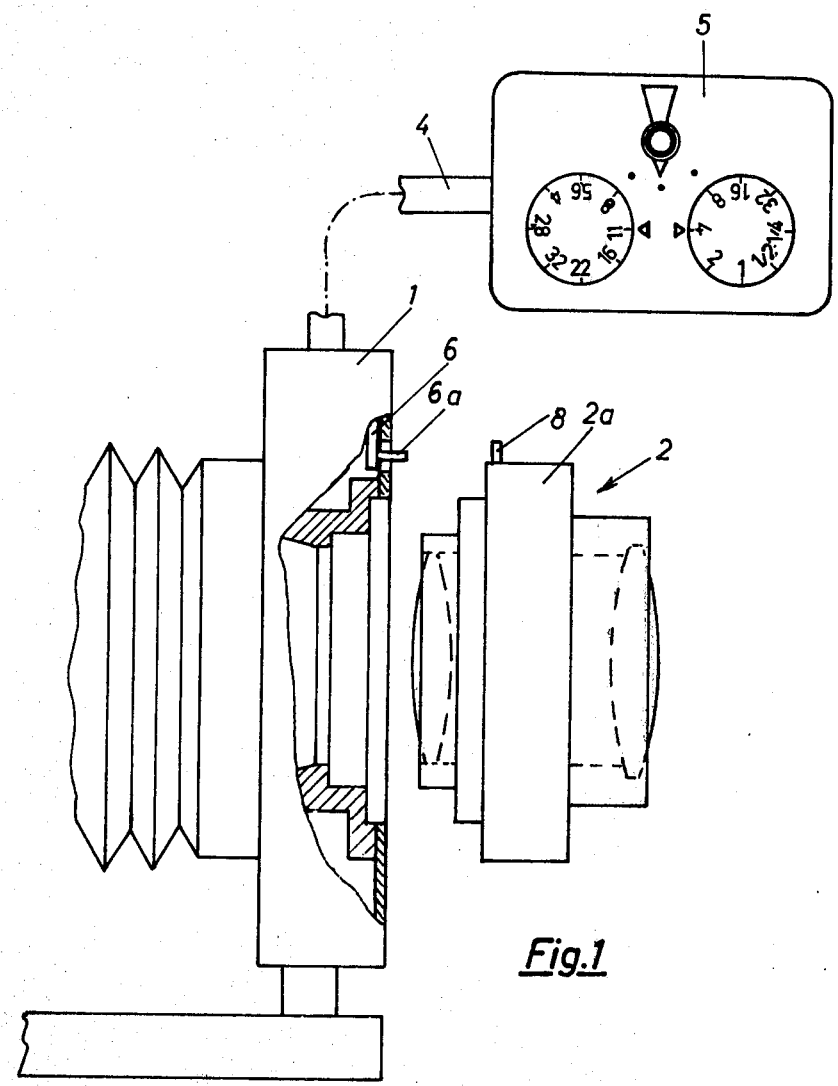
FIG. 1 shows the control housing of a bellows camera including an interchangeable lens attachable to the control housing as well as a remote control device by means of which the factors of time and stop can be keyed into the camera.

In FIG. 1, the control housing of a bellows camera is shown by numeral 1. This is combined with a lens carrier to be described which can be interchangeably attachable to this housing unit, by means of a (not here detailed) change mount which includes lenses 2 of the same basic design described in what follows in greater detail but having different diameters $D_1$ and $D_2$, respectively, of the light aperture 0 (see FIGS. 2 and 3).

Figure 2:
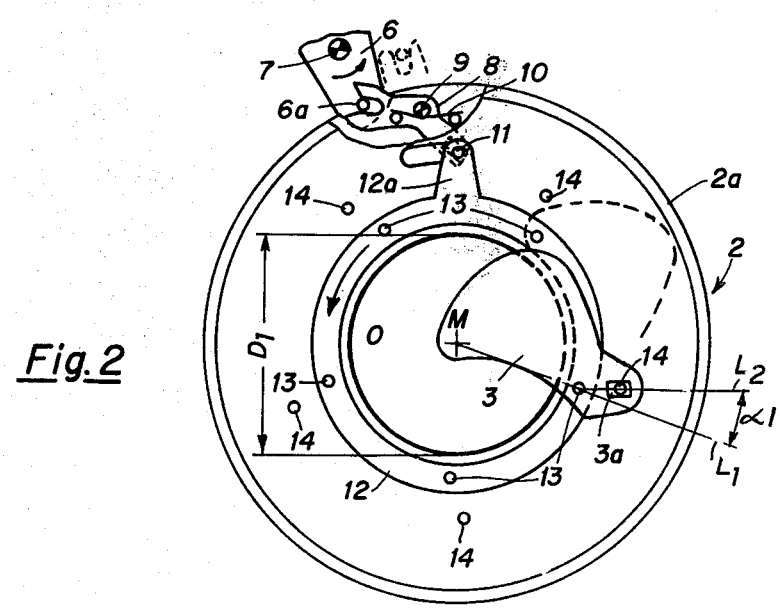
FIG. 2 illustrates a top view of the interior of an interchangeable lens, attachable to the camera or to the shutter, having the widest possible light aperture $D_1$, including the sector system, of which only one sector is shown for the sake of simplicity.

As may be seen in FIGS. 2 and 3, each one of these lens units is equipped with a sector system, of which only one sector member 3 is shown in each of the stated views. No stop mechanism is specifically shown because it is of no relevance for the understanding of the invention and various known forms can be used. Whereas the sectors 3 are accommodated in the housing 2a of the interchangeable lens 2, the drive mechanism for this sector system, as well as the respective regulating mechanism to form the exposure time and the stop, is accommodated in the control housing 1 of the bellows camera. As indicated in FIG. 1, a manually operable remote control device 5 serving to key in the factors time and stop is connectable to the control housing 1 by means of an electric connecting wire 4. Since it is also assumed that the control or regulating mechanism in housing 1 is known from the aspect of both design and function so that it cannot be an object of the invention, only its drive lever 6 which can be caused actively to engage the sector system driving means on the lens side is shown.

This drive lever 6, in turn, can pivot about a shaft 7, and its one end is equipped with a pin 6a which, when attaching or locking the interchangeable lens 2 to the control housing 1, is automatically caused to engage actively a power transmission member 8 provided at the lens side and designed in the form of a dual lever. At its other end, (see FIG. 2, for example), said dual lever 8, which is mounted on a fixed pin 9 and rotatable against the force of a spring 10, engages a pin 11 attached to a radially extending arm 12a of a ring 12 serving to drive the sectors.

The drive ring 12 is disposed coaxial and rotatable relative to the light aperture 0 and by means of pins 13 is caused to be in driving connection with each of the sectors 3. These sectors, in turn, are each mounted on a fixed pin 14 so that they can pivot without a radial slot 3a which is formed in each sector. The arrangement is such that upon a rotary motion of the drive member 6 disposed on the camera side, the drive lever 8 on the lens side is turned in the direction of the arrow and the sectors 3, pivoting about the fixed pins 14, are moved into the open position indicated by dashed lines (FIGS. 2 and 3). From this open position, upon a rotary motion of the drive ring 12 in opposite direction, the sectors 3 return into their initial position shown in the drawing as soon as the lever mechanism 8 is caused to perform a rotary motion opposite to the arrow direction shown in FIG. 2.

The interchangeable lens according to FIG. 3 is of the same design as the lens according to FIG. 2. Since the dimensions of the sector drive members, as well as of the sectors themselves, are identically those of the embodiment shown in FIG. 2, these parts have also been given the same reference numbers. Apart from the actual optics, the two lenses differ from each other only by the diameters of their light apertures 0. Whereas FIG. 2 shows an interchangeable lens with the greatest possible diameter $D_1$ for the light aperture 0, the lens design shown in FIG. 3 will be recognized as one in which the diameter $D_2$ of the light aperture 0, has been kept smaller. This means that the sectors 3 of a lens with a smaller light aperture 0, but with the same sector drive, must traverse a greater overall distance than those of a lens with the widest possible light aperture. The consequence would, in turn, be within ununiformly effective times E (see FIGS. 6, 7, and 8) and, therefore, inaccurate exposure times in general. As FIGS. 2 and 3 show, this can be remedied in simple manner by disposing the fixed mounting pin 14 in a certain relative position to the drive pin 13, in adaptation to the respective diameter $D_1$ and $D_2$, such that equal parts of the overtravel which the sectors 3 of an interchangeable lens having a light aperture 0 smaller than the widest possible one must make relative to the diameters $D_1$, $D_2$, respectively, are always traversed in the overlap and in the overtravel phase. These travel ratios are clearly recognizable from FIGS. 6 and 7 which show the diagram of light flux plotted against time diagrams typical for the two embodiments of a change lens 2 shown in FIGS. 2 and 3.

In both diagrams, the total distance traveled by the sectors 3 during one back and forth movement is designated as S which, measured by the diameter $D_1$ or $D_2$ of the light aperture 0, includes a certain amount of overtravel. As may further be seen from the diagrams, always equal parts $s_1$ and $s_2$ or $s_1'$ and $s_2'$, respectively, (see FIGS. 6 and 7) of this overtravel are placed into the overlap and overtravel phases $U_1$ and $U_2$ of the sector system for the purpose of achieving uniform effective times E. As to the light flux viewing time diagrams shown, there remains to be said that the trapezoidal curve (oscillogram) shown therein should be regarded as a reproduction of the shutter behavior during one opening and closing motion of the sector system. When related to the system of coordinates, the trend of the curve, which first extends in vertical direction, then horizontally and finally in declining direction again, permits a conclusion to be drawn as to the size or amplitude A of the sector systems' pivoting motion and as to the spacing, to be measured in units of time, of the two flanks of this curve shape for the duration or time $t$ of the light flux penetrating the light aperture 0.

The configuration of the fixed mounting pin 14 relative to the drive pin 13 becomes particularly clear if, as shown in FIGS. 2 and 3, a line $L_1$ is drawn connecting the center M of the light aperture 0 with the drive pin 13 and extending to the extreme boundary of the change lens 2, as well as another line $L_2$ through pin 13 and the fixed mounting pin 14. These two connecting lines $L_1$ and $L_2$ intersect in the area of the drive pin 13 and include an angle $\alpha 1$ and $\alpha 2$, respectively, the size of which depends upon the diameter $D_1'$ $D_2$ of the light aperture 0. Basically, what applies here is that the angle $\alpha 1$ of a change lens having the greatest possible light aperture diameter $D_1$ according to FIG. 2 is smaller than the angle $\alpha 2$ of a lens having smaller light aperture diameter $D_2$ according to FIG. 3. This means that the two angles $\alpha 1$ and $\alpha 2$ are inversely proportional to the respective diameters $D_1$ and $D_2$ of the light aperture 0.

Figure 6:
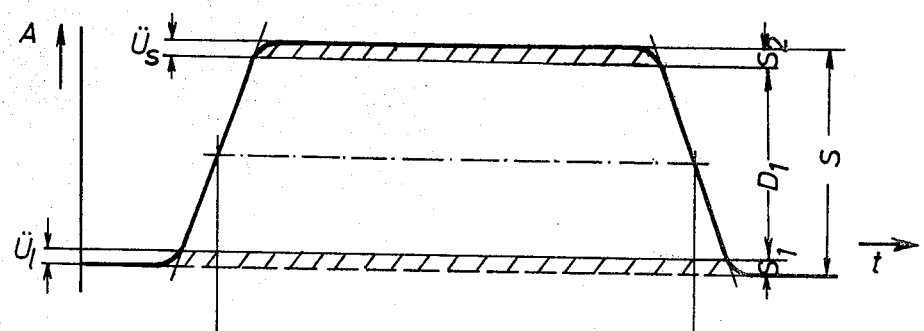
FIG. 6 is a curve showing the light flux time diagram of an interchangeable lens design according to FIG. 2 plotted against time with the widest possible light aperture $D_1$.

According to the embodiment of an interchangeable lens shown in FIG. 4 whose basic design is identical with the one described above, the fixed mounting pins 14 serving the sectors 3 may be disposed on a separate supporting ring 17 coaxial to the light aperture 0. Screws 18 or the like penetrating, as may be seen particularly in FIg. 5, slotlike cutouts 17a extending in tangential direction which, in turn, permit a relative motion of the supporting ring 17 in the one or the other circumferential direction within certain limits, may serve to fasten said ring. This for the purpose of adjusting the total distance S traveled by the sectors 3 during one back and forth motion relative to the diameter $D_3$ of the light aperture 0 so that the effective time E adequate as per the light flux/time diagram forms, as shown in FIG. 6. Therein, the curve shown above the optimum light flux/time diagram (unbroken line) is the upper setting limit, shown in dashed lines, achievable by appropriately turning the supporting ring 17, and the curve below the optimum light flux/time diagram is the lower limit shown in dash-dotted lines.

Concerning the means employed for the relative adjustment of the supporting ring 17, this may be an eccentric screw 20 engaging a radial slot 17*b* formed in the ring 17 (see FIG. 5). For adjustment of the relative position of the mounting pins 14 disposed on the supporting ring 17 all that is necessary is to turn the eccentric screw 20 in the one or the other direction, the consequence of which is that the supporting ring 17 is moved slightly in the one or the other arrow directions. Following this, only the fastening screws 18 need be tightened which completes the fixation of the supporting 17 and, with it, of the fixed mounting pins 14 serving as pivot pints for the sectors 3, in their position relative to the drive pins 13.

What is claimed is:

1. A camera construction having a lens mechanism having a known axis position and where the mechanism includes means for opening the lens to admit external light to the lens in one position and to blank out light to the lens in a second position selectively and which comprises an oscillating built in sector system and a plurality of independent lens systems which are selectively exchangeable one for another of a substantially like form which has a substantially like axial location and wherein the combination comprises for each drive mechanism a lens mechanism to provide a plurality of different focal lengths and apertures for the lens mechanism including a plurality of covering sectors to cover the lens axis and set the pivotal predetermined sector travel distance to cover and reveal each selected lens aperture in accordance with the sector position, a ring means carried and supported in concentric relationship to the lens axis, a support ring, a plurality of pin engaging means supported by the ring means for carrying the pivotable sectors, drive pin means located about the ring means, a drive mechanism means connected to the camera to engage the ring automatically to the drive mechanism for attaching the lens to the camera and to pivotally control the position of the covering sectors, means for engaging all lens elements of different aperture individually to the ring means and for driving the same from the said drive means, and means having a light aperture of different sizes at positions of uniform sector travel distance relative to the lens so that with a lens having a light aperture smaller than the maximum possible sector movement the excess travel distance due to diminution of the light aperture is allocated approximately equal parts to the overlap and overswing phases of the sector system as pivoted by the drive pin means and the drive pins of the ring mechanism when engaged by the drive mechanism.

2. The interchangeable lens structure according to claim 1 comprising also means for controlling the relative position of the pin means of the driven sectors relative to the lens drive means and the engaging means on the ring according to the chosen lens aperture.

3. The interchangeable lens structure according to claim 2 comprising, in addition, a separate ring means to position the fixed mounting pins of the sector system on the ring and screw means to fasten the ring to the lens and, in addition, means effecting an adjustment of the last-named ring within fine adjustable limits.

4. The interchangeable lens structure according to claim 3 including a means for mounting the pin means at the ring means and a fastening screw means to position the fastening screw in the ring in an eccentric position relative to the ring and wherein the ring has a radial slot with which the screw is to engage the ring means to establish the fine adjustment of the ring supporting the mounting pins.

* * * * *